United States Patent
Hibino

(10) Patent No.: US 9,800,329 B2
(45) Date of Patent: Oct. 24, 2017

(54) OPTICAL NETWORK SYSTEM, OPTICAL TRANSMISSION DEVICE, AND FAILURE OCCURRENCE SECTION DETERMINATION METHOD

(71) Applicant: FUJITSU LIMITED, Kawasaki-shi, Kanagawa (JP)

(72) Inventor: Hironori Hibino, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/171,452

(22) Filed: Jun. 2, 2016

(65) Prior Publication Data

US 2016/0359554 A1   Dec. 8, 2016

(30) Foreign Application Priority Data

Jun. 5, 2015   (JP) .................................. 2015-115133

(51) Int. Cl.
| | | |
|---|---|---|
| H04B 10/079 | (2013.01) | |
| H04B 10/27 | (2013.01) | |
| H04B 10/29 | (2013.01) | |
| H04J 3/07 | (2006.01) | |
| H04J 3/04 | (2006.01) | |
| H04B 10/077 | (2013.01) | |

(52) U.S. Cl.
CPC ................................ *H04B 10/0771* (2013.01)

(58) Field of Classification Search
None
See application file for complete search history.

(56) References Cited

U.S. PATENT DOCUMENTS

| | | | | |
|---|---|---|---|---|
| 6,094,442 A | * | 7/2000 | Okamoto | .................. H04J 3/14 370/506 |
| 6,725,401 B1 | | 4/2004 | Lindhorst-Ko | |
| 8,711,711 B2 | * | 4/2014 | Kim | ..................... H04L 25/0266 340/500 |
| 2002/0131099 A1 | | 9/2002 | Harasawa | |

(Continued)

FOREIGN PATENT DOCUMENTS

| | | |
|---|---|---|
| EP | 1347591 A2 | 9/2003 |
| JP | 2002-280978 | 9/2002 |

(Continued)

OTHER PUBLICATIONS

EESR—The Extended European Search Report of European Patent Application No. 16172134.5 dated Oct. 19, 2016.

*Primary Examiner* — Oommen Jacob
(74) *Attorney, Agent, or Firm* — Fujitsu Patent Center

(57) ABSTRACT

An optical network system includes: a plurality of optical transmission devices, each includes a transmitting unit configured to superimpose, on a main signal to be transmitted, a monitoring signal of a different wavelength from wavelengths of other optical transmission devices, the wavelength differing from wavelengths for other optical transmission devices in the optical network system, and an extraction unit configured to extract monitoring signals from main signals received from the other optical transmission devices, wherein a failure occurrence section where a communication failure occurs is determined, based on the monitoring signals extracted by the extraction unit, among transmission sections between the respective optical transmission devices.

7 Claims, 14 Drawing Sheets

(56) References Cited

U.S. PATENT DOCUMENTS

| | | | |
|---|---|---|---|
| 2002/0176130 A1* | 11/2002 | Maeno | H04B 10/0791 398/20 |
| 2003/0011855 A1 | 1/2003 | Fujiwara | |
| 2003/0099010 A1 | 5/2003 | Liu et al. | |
| 2004/0120706 A1* | 6/2004 | Johnson | H04B 10/07 398/10 |
| 2004/0208520 A1* | 10/2004 | Palacharla | H04B 10/0771 398/30 |
| 2006/0029391 A1* | 2/2006 | Yuki | H04J 14/0221 398/45 |
| 2006/0210266 A1* | 9/2006 | Aoki | H04Q 11/0005 398/19 |
| 2006/0216038 A1 | 9/2006 | Yokota et al. | |
| 2007/0003181 A1* | 1/2007 | Stevens | G01D 5/35383 385/5 |
| 2007/0116462 A1 | 5/2007 | Peloso et al. | |
| 2008/0240710 A1* | 10/2008 | Nishioka | H04B 10/03 398/5 |
| 2010/0014855 A1* | 1/2010 | Arnone | H04J 14/0227 398/17 |
| 2015/0043907 A1* | 2/2015 | Cavaliere | H04J 14/0247 398/30 |
| 2015/0280855 A1* | 10/2015 | Mertz | H04J 14/06 398/65 |
| 2016/0359554 A1* | 12/2016 | Hibino | H04B 10/0791 |

FOREIGN PATENT DOCUMENTS

| | | |
|---|---|---|
| JP | 2003-032192 | 1/2003 |
| JP | 2006-270270 | 10/2006 |

* cited by examiner

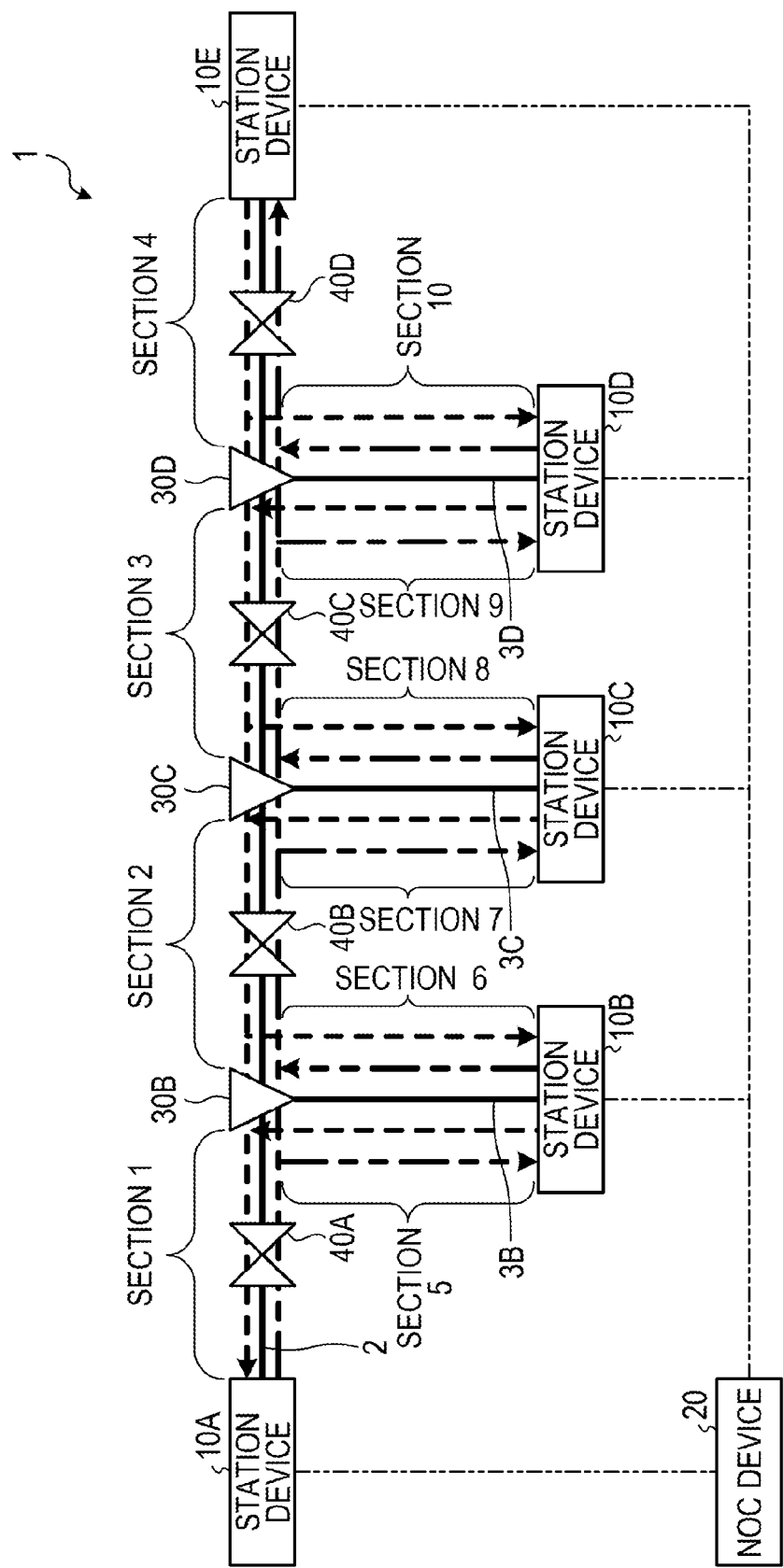

FIG.4A

| STATION DEVICE (FREQUENCY) | SECTION 1 | SECTION 2 | SECTION 3 | SECTION 4 | SECTION 5 | SECTION 7 | SECTION 9 |
|---|---|---|---|---|---|---|---|
| STATION DEVICE B (fB) | × | ○ | ○ | ○ | × | ○ | ○ |
| STATION DEVICE C (fC) | × | × | ○ | ○ | ○ | × | ○ |
| STATION DEVICE D (fD) | × | × | × | ○ | ○ | ○ | × |
| STATION DEVICE E (fE) | × | × | × | × | ○ | ○ | ○ |

FIG.4B

| STATION DEVICE (FREQUENCY) | SECTION 1 | SECTION 2 | SECTION 3 | SECTION 4 | SECTION 5 | SECTION 6 | SECTION 7 | SECTION 9 |
|---|---|---|---|---|---|---|---|---|
| STATION DEVICE A (fA) | × | ○ | ○ | ○ | × | ○ | ○ | ○ |
| STATION DEVICE C (fC) | ○ | × | ○ | ○ | ○ | × | × | ○ |
| STATION DEVICE D (fD) | ○ | × | × | ○ | ○ | × | ○ | × |
| STATION DEVICE E (fE) | ○ | × | × | × | ○ | × | ○ | ○ |

FIG.4C

| STATION DEVICE (FREQUENCY) | SECTION 1 | SECTION 2 | SECTION 3 | SECTION 4 | SECTION 6 | SECTION 7 | SECTION 8 | SECTION 9 |
|---|---|---|---|---|---|---|---|---|
| STATION DEVICE A (fA) | × | × | ○ | ○ | ○ | × | ○ | ○ |
| STATION DEVICE B (fB) | ○ | × | ○ | ○ | × | × | ○ | ○ |
| STATION DEVICE D (fD) | ○ | ○ | × | ○ | ○ | ○ | × | × |
| STATION DEVICE E (fE) | ○ | ○ | × | × | ○ | ○ | × | ○ |

FIG.4D

| STATION DEVICE (FREQUENCY) | SECTION 1 | SECTION 2 | SECTION 3 | SECTION 4 | SECTION 6 | SECTION 8 | SECTION 9 | SECTION 10 |
|---|---|---|---|---|---|---|---|---|
| STATION DEVICE A (fA) | × | × | × | ○ | ○ | ○ | × | ○ |
| STATION DEVICE B (fB) | ○ | × | × | ○ | × | ○ | × | ○ |
| STATION DEVICE C (fC) | ○ | ○ | × | ○ | ○ | × | × | ○ |
| STATION DEVICE E (fE) | ○ | ○ | ○ | × | ○ | ○ | ○ | × |

FIG.4E

| STATION DEVICE (FREQUENCY) | SECTION 1 | SECTION 2 | SECTION 3 | SECTION 4 | SECTION 6 | SECTION 8 | SECTION 10 |
|---|---|---|---|---|---|---|---|
| STATION DEVICE A (fA) | × | × | × | × | ○ | ○ | ○ |
| STATION DEVICE B (fB) | ○ | × | × | × | × | ○ | ○ |
| STATION DEVICE C (fC) | ○ | ○ | × | × | ○ | × | ○ |
| STATION DEVICE D (fD) | ○ | ○ | ○ | × | ○ | ○ | × |

21e

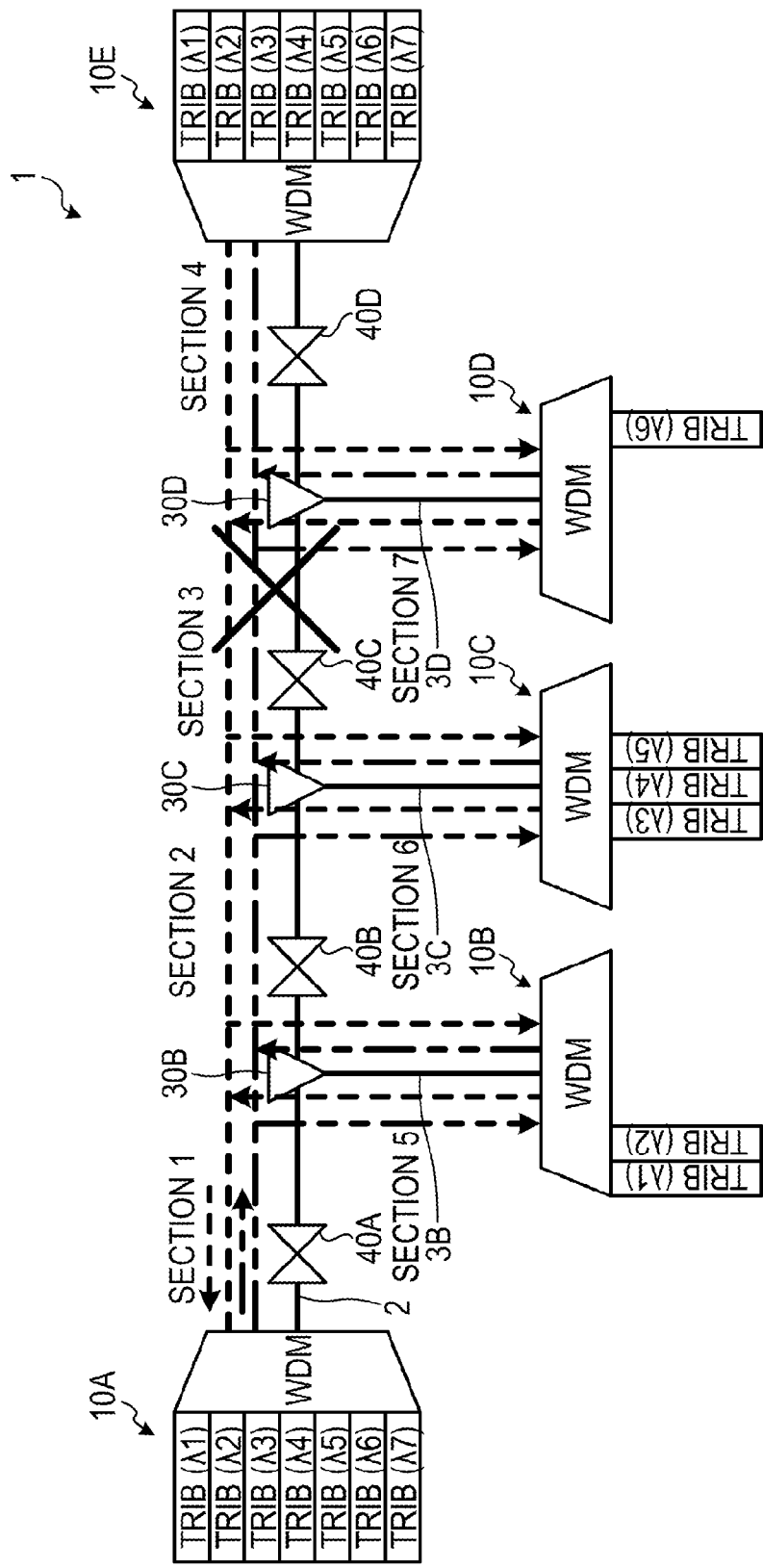

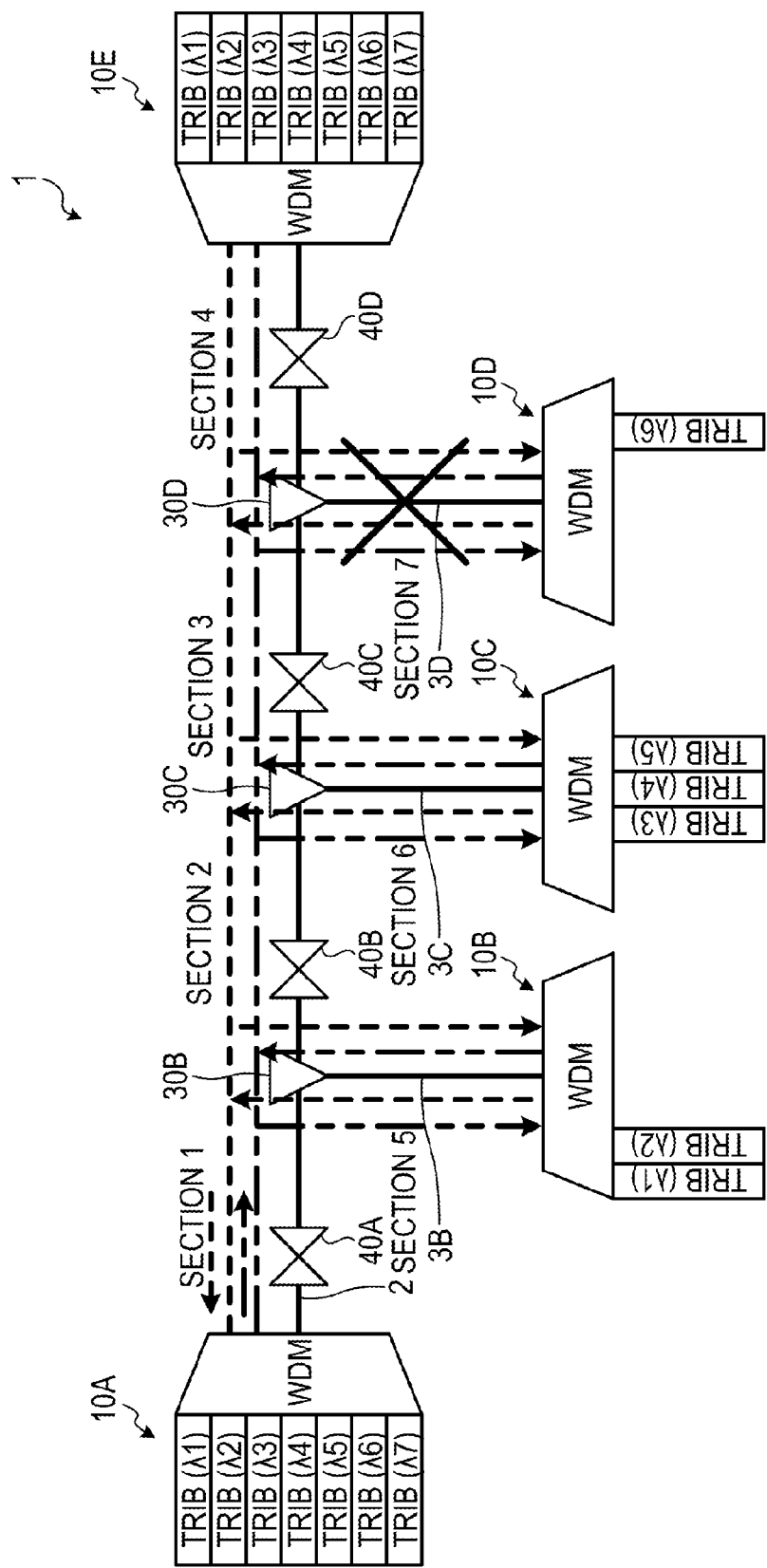

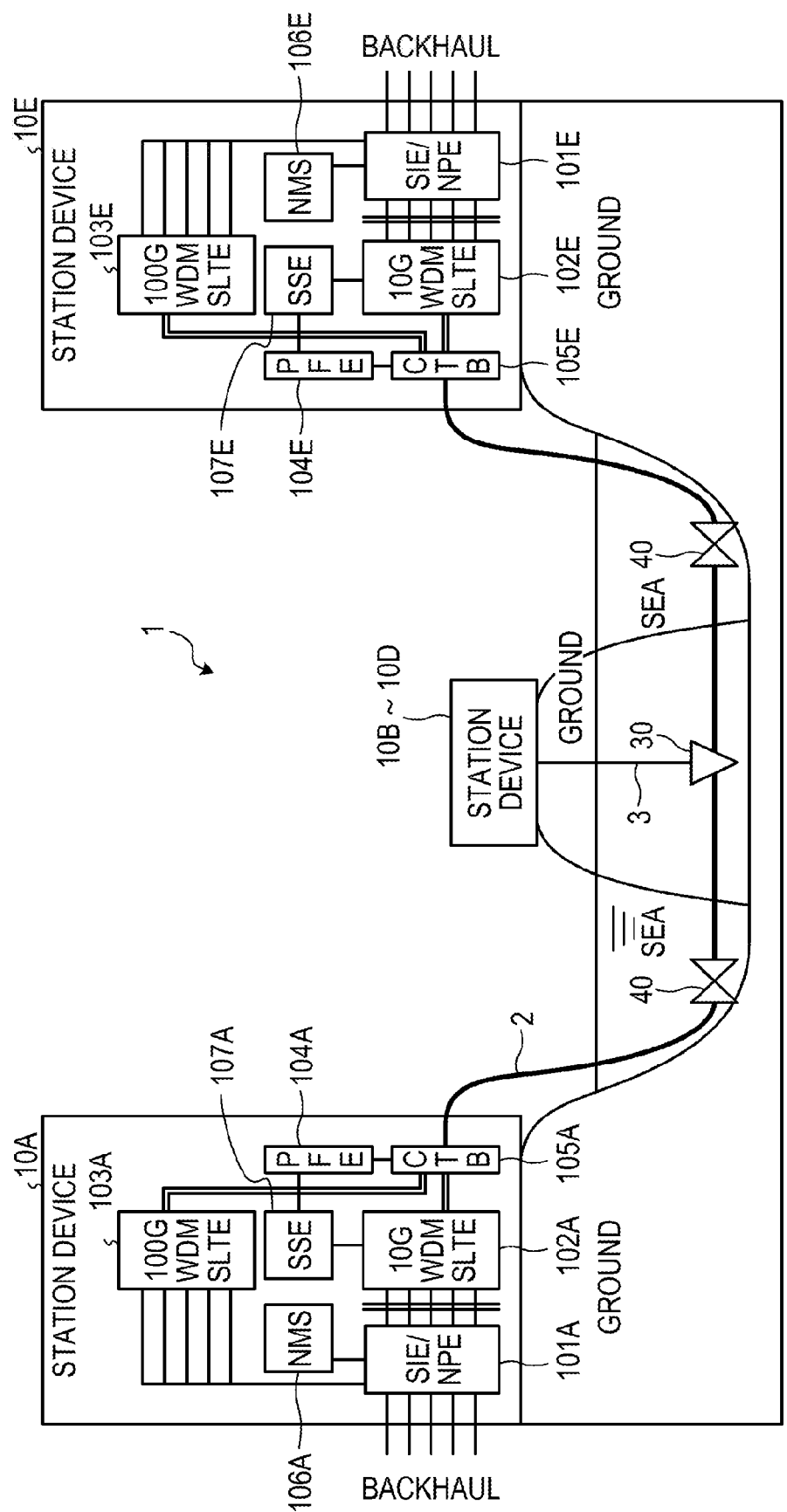

OPTICAL NETWORK SYSTEM, OPTICAL TRANSMISSION DEVICE, AND FAILURE OCCURRENCE SECTION DETERMINATION METHOD

CROSS-REFERENCE TO RELATED APPLICATION

This application is based upon and claims the benefit from priority of the prior Japanese Patent Application No. 2015-115133, filed on Jun. 5, 2015, the entire contents of which are incorporated herein by reference.

FIELD

The embodiments discussed herein are related to an optical network system, an optical transmission device, and a failure occurrence section determination method.

BACKGROUND

In an optical network system, in order to specify a location where a communication failure occurs, a command is sequentially transmitted from an optical transmission device to each of relay devices one by one on a transmission line, and a relay device or a transmission section where the communication failure occurs is specified depending on a presence or a non-presence of a response to the command.

Related technologies are disclosed in, for example, Japanese Laid-Open Patent Publication No. 2003-032192 and Japanese Laid-Open Patent Publication No. 2002-280978.

SUMMARY

According to an aspect of the invention, an optical network system includes: a plurality of optical transmission devices, each includes a transmitting unit configured to superimpose, on a main signal to be transmitted, a monitoring signal of a different wavelength from wavelengths of other optical transmission devices, the wavelength differing from wavelengths for other optical transmission devices in the optical network system, and an extraction unit configured to extract monitoring signals from main signals received from the other optical transmission devices, wherein a failure occurrence section where a communication failure occurs is determined, based on the monitoring signals extracted by the extraction unit, among transmission sections between the respective optical transmission devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a block diagram illustrating an exemplary optical transmission system according to an embodiment;

FIG. 4A is a view illustrating an exemplary station device A matrix according to an embodiment;

FIG. 4B is a view illustrating an exemplary station device B matrix according to an embodiment;

FIG. 4C is a view illustrating an exemplary station device C matrix according to an embodiment;

FIG. 4D is a view illustrating an exemplary station device D matrix according to an embodiment;

FIG. 4E is a view illustrating an exemplary station device E matrix according to an embodiment;

FIG. 7A is a diagram illustrating an exemplary outline of a process of determining a failure occurrence section according to an embodiment (example 1);

FIG. 7B is a diagram illustrating an exemplary outline of a process of determining a failure occurrence section according to an embodiment (example 2);

FIG. 9 is a diagram illustrating an exemplary application of an embodiment.

DESCRIPTION OF EMBODIMENTS

When an optical network system is a large-capacity and large-scale network including, for example, optical wavelength division multiplexing devices and submarine cables, it takes time to specify a device or a transmission section where a communication failure occurs, in the method that checks a presence or a non-presence of a response from each of devices one by one. Hence, the communication failure continues for an extended time period in the large-capacity and large-scale network that requires a quick failure restoration, resulting in a large social influence.

Hereinafter, descriptions will be made on embodiments of an optical network system, an optical transmission device, and a failure occurrence section determination method capable of quickly performing a failure restoration with reference to the accompanying drawings. In the following descriptions of embodiments, only configurations related to the present disclosure will be described, and descriptions of other configurations will be omitted. Further, in the following descriptions of embodiments, overlapping descriptions of identical or similar configurations or processes will be omitted. The embodiments to be described below are not intended to limit the present disclosure but the embodiments and other embodiments may be properly combined with one another within a reasonable scope.

First Embodiment

[Optical Transmission System]

Figure 1B:
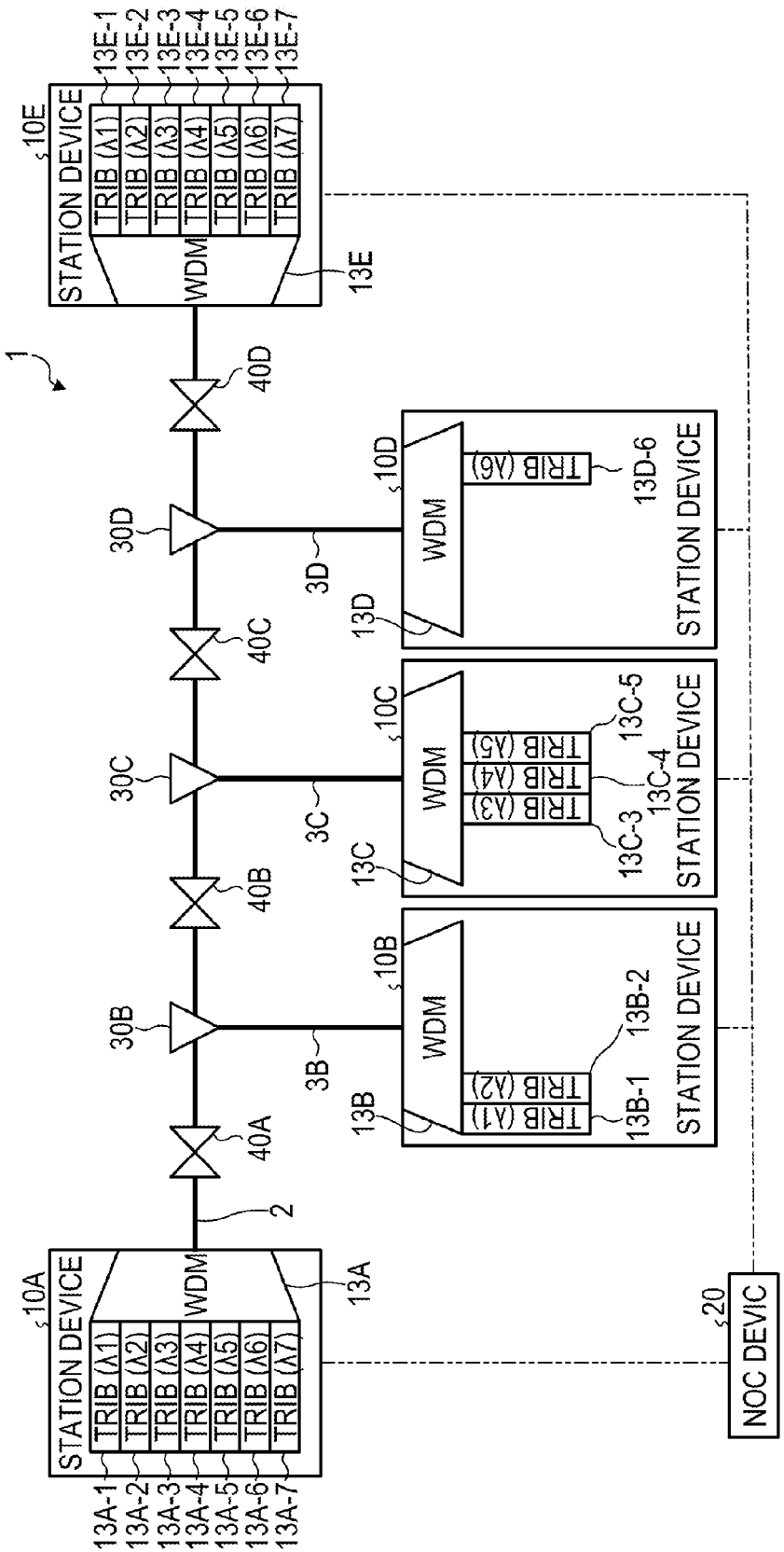
FIG. 1B is a block diagram illustrating an exemplary optical transmission system according to an embodiment.

FIGS. 1A and 1B are block diagrams illustrating an exemplary optical transmission system according to an embodiment. An optical network system 1 according to an embodiment is a fish-bone type optical submarine cable communication system, for example, which connects station devices located on the grounds to each other through an optical submarine cable. As illustrated in FIG. 1A, the optical network system 1 includes station devices 10A to 10E which are ground stations, and a network operation center (NOC) device 20. The station devices 10A and 10E are connected to each other by a trunk line 2, which is an optical submarine cable.

Branching units (BUs) 30B to 30D are disposed on the trunk line 2. In the BU 30B, a branch line 3B which is a landing cable is branched from the trunk line 2. The BU 30B is an add/drop unit that connects the trunk line 2 with the station device 10B that is a ground station, to each other. The BU 30B drops an optical signal addressed to the station device 10B from a main signal transmitted on the trunk line 2. The BU 30B removes the optical signal dropped from the main signal transmitted on the trunk line 2 by using a filter, and then, multiplexes an optical signal added from the station device 10B with the main signal on the trunk line 2.

Likewise, in the BU 30C, a branch line 3C which is a ground cable is branched from the trunk line 2. The BU 30C is an add/drop unit that connects the trunk line 2 with the station device 10C that is a ground station, to each other. The BU 30C drops an optical signal addressed to the station device 10C from a main signal transmitted on the trunk line 2. The BU 30C removes the optical signal dropped from the main signal transmitted on the trunk line 2, and then, multiplexes an optical signal added from the station device 10C with the main signal on the trunk line 2.

In the BU 30D, a branch line 3D which is a ground cable is branched from the trunk line 2. The BU 30D is an add/drop unit that connects the trunk line 2 with the station device 10D that is a ground station, to each other. The BU 30D drops an optical signal addressed to the station device 10D from the main signal transmitted on the trunk line 2. The BU 30D removes the optical signal dropped from the main signal transmitted on the trunk line 2, and then, multiplexes an optical signal added from the station device 10D with the main signal on the trunk line 2.

Further, relay units 40A to 40D are disposed on the trunk line 2. The relay unit 40A is disposed between the station device 10A and the BU 30B, and is a repeater that amplifies and relays the main signal transmitted on the trunk line 2. Likewise, the relay unit 40B is disposed between the BU 30B and the BU 30C, and is a repeater that amplifies and relays the main signal transmitted on the trunk line 2. The relay unit 40C is disposed between the BU 30C and the BU 30D, and is a repeater that amplifies and relays the main signal transmitted on the trunk line 2. The relay unit 40D is disposed between the BU 30D and the station device 10E, and is a repeater that amplifies and relays the main signal transmitted on the trunk line 2.

Although not illustrated, gain equalizers (GEQs) are appropriately disposed on the trunk line 2 so as to compensate for signal deterioration.

The NOC device 20 controls and manages the station devices 10A to 10E. The NOC device 20 is connected to each of the station devices 10A to 10E by a wired or wireless communication line which is different from the trunk line 2 and the branch lines 3B to 3D.

The station devices 10A to 10E will be collectively referred to as "station devices 10." The BUs 30B to 30D will be collectively referred to as "BUs 30." The relay units 40A to 40D will be collectively referred to as "relay units 40." The branch lines 3B to 3D will be collectively referred to as "branch lines 3."

As illustrated in FIG. 1A, "Section 1" will denote a bidirectional section of the trunk line 2 which includes a section of the trunk line 2 where a main signal travels from the station device 10A toward the BU 30B and a section of the trunk line 2 where a main signal travels from the BU 30B toward the station device 10A. "Section 2" will denote a bidirectional section of the trunk line 2 which includes a section of the trunk line 2 where a main signal travels from the BU 30B toward the BU 30C and a section of the trunk line 2 where a main signal travels from the BU 30C toward the BU 30B.

"Section 3" will denote a bidirectional section of the trunk line 2 which includes a section of the trunk line 2 where a main signal travels from the BU 3C toward the BU 30D and a section of the trunk line 2 where a main signal travels from the BU 30D toward the station device 10C. "Section 4" will denote a bidirectional section of the trunk line 2 which includes a section of the trunk line 4 where a main signal travels from the BU 30D toward the station device 10E and a section of the trunk line 2 where a main signal travels from the station device 10E toward the BU 30D.

"Section 5" will denote a section of the branch line 3B where a main signal traveling from the station device 10A toward the station device 10E on the trunk line 2 is dropped by the BU 30B to reach the station device 10B, as illustrated in FIG. 1A. "Section 5" includes a section of the branch line 3B, which runs from the station device 10B to the BU 30B and where a signal from the station device 10B is added by the BU 30B to the main signal traveling from the station device 10E toward the station device 10A on the trunk line 2.

Likewise, "Section 6" will denote a section of the branch line 3B where a main signal traveling from the station device 10E toward the station device 10A on the trunk line 2 is dropped by the BU 30B to reach the station device 10B. "Section 6" includes a section of the branch line 3B, which runs from the station device 10B to the BU 30B and where a signal from the station device 10B is added by the BU 30B to the main signal traveling from the station device 10A toward the station device 10E on the trunk line 2.

"Section 7" will denote a section of the branch line 3C where a main signal traveling from the station device 10A toward the station device 10E on the trunk line 2 is dropped by the BU 30C to reach the station device 10C. "Section 7" includes a section of the branch line 3C, which runs from the station device 10C to the BU 30C and where a signal from the station device 10C is added by the BU 30C to the main signal traveling from the station device 10E toward the station device 10A on the trunk line 2.

"Section 8" will denote a section of the branch line 3C where a main signal traveling from the station device 10E toward the station device 10A on the trunk line 2 is dropped by the BU 30C to reach the station device 10C. "Section 8" includes a section of the branch line 3C, which runs from the station device 10C to the BU 30C and where a signal from the station device 10C is added by the BU 30C to the main signal traveling from the station device 10A toward the station device 10E on the trunk line 2.

"Section 9" will denote a section of the branch line 3D where a main signal traveling from the station device 10A toward the station device 10E on the trunk line 2 is dropped by the BU 30D to reach the station device 10D. "Section 9" includes a section of the branch line 3D, which runs from the station device 10D to the BU 30D and where a signal from the station device 10D is added by the BU 30D to the main signal traveling from the station device 10E toward the station device 10A on the trunk line 2.

"Section 10" will denote a section of the branch line 3D where a main signal traveling from the station device 10E toward the station device 10A on the trunk line 2 is dropped by the BU 30D to reach the station device 10D. "Section 10"

includes a section of the branch line 3D, which runs from the station device 10D to the BU 30D and where a signal from the station device 10D is added by the BU 30D to the main signal traveling from the station device 10A toward the station device 10E on the trunk line 2.

As illustrated in FIG. 1B, the station device 10A includes a tributary (TRIB) ($\lambda$1) 13A-1 to a TRIB ($\lambda$7) 13A-7 and a wavelength division multiplexer (WDM) 13A. The TRIB ($\lambda$1) 13A-1 to the TRIB ($\lambda$7) 13A-7 generate optical signals of wavelengths $\lambda$1 to $\lambda$7, respectively. The WDM 13A multiplexes the optical signals generated by the TRIB ($\lambda$1) 13A-1 to TRIB ($\lambda$7) 13A-7 to generate a main signal and send out the main signal to the trunk line 2.

Likewise, the station device 10B includes a TRIB ($\lambda$1) 13B-1 and a TRIB ($\lambda$2) 13B-2, and a WDM 13B. The TRIB ($\lambda$1) 13B-1 and the TRIB ($\lambda$2) 13B-2 generate optical signals of wavelengths $\lambda$1 and $\lambda$2, respectively. The WDM 13B multiplexes the optical signals generated by the TRIB ($\lambda$1) 13B-1 and the TRIB ($\lambda$2) 13B-2 to generate a main signal and send out the main signal to the branch line 3B.

The station device 10C includes a TRIB ($\lambda$3) 13C-3 to a TRIB ($\lambda$5) 13C-5, and a WDM 13C. The TRIB ($\lambda$3) 13C-3 to the TRIB ($\lambda$5) 13C-5 generate optical signals of wavelengths $\lambda$3 to $\lambda$5, respectively. The WDM 13C multiplexes the optical signals generated by the TRIB ($\lambda$3) 13C-3 to the TRIB ($\lambda$5) 13C-5 to generate a main signal and send out the main signal to the branch line 3C.

The station device 10D includes a TRIB ($\lambda$6) 13D-6 and a WDM 13D. The TRIB ($\lambda$6) 13D-6 generates an optical signal of a wavelength $\lambda$6. The WDM 13D generates a main signal from the optical signal generated by the TRIB ($\lambda$6) 13D-6 and sends out the main signal to the branch line 3D.

The station device 10E includes a TRIB ($\lambda$1) 13E-1 to a TRIB ($\lambda$7) 13E-7, and a WDM 13E. The TRIB ($\lambda$1) 13E-1 to the TRIB ($\lambda$7) 13E-7 generate optical signals of wavelengths $\lambda$1 to $\lambda$7, respectively. The WDM 13E multiplexes the optical signals generated by the TRIB ($\lambda$1) 13E-1 to the TRIB ($\lambda$7) 13E-7 to generate a main signal and send out the main signal to the trunk line 2.

That is, in the example illustrated in FIG. 1B, the station devices 10A and 10E transmit and receive signals of wavelengths $\lambda$1 to $\lambda$7 with each other. The signals of wavelengths $\lambda$1 and $\lambda$2 are transmitted and received between the station devices 10A and 10B and between the station devices 10B and 10E. The signals of wavelengths $\lambda$3 to $\lambda$5 are transmitted and received between the station devices 10A and 10C and between the station devices 10C and 10E. A signal of a wavelength $\lambda$6 is transmitted and received between the station devices 10A and 10D and between the station devices 10D and 10E.

Meanwhile, in the optical network system 1 illustrated in FIGS. 1A and 1B, the number of the station devices 10A to 10E, the BUs 30B to 30D, and the relay units 40A to 40E is merely exemplary. That is, the number of the station devices, the BUs, and the relay units included in the optical network system 1 may be properly modified.

[Station Devices]

Figure 2:
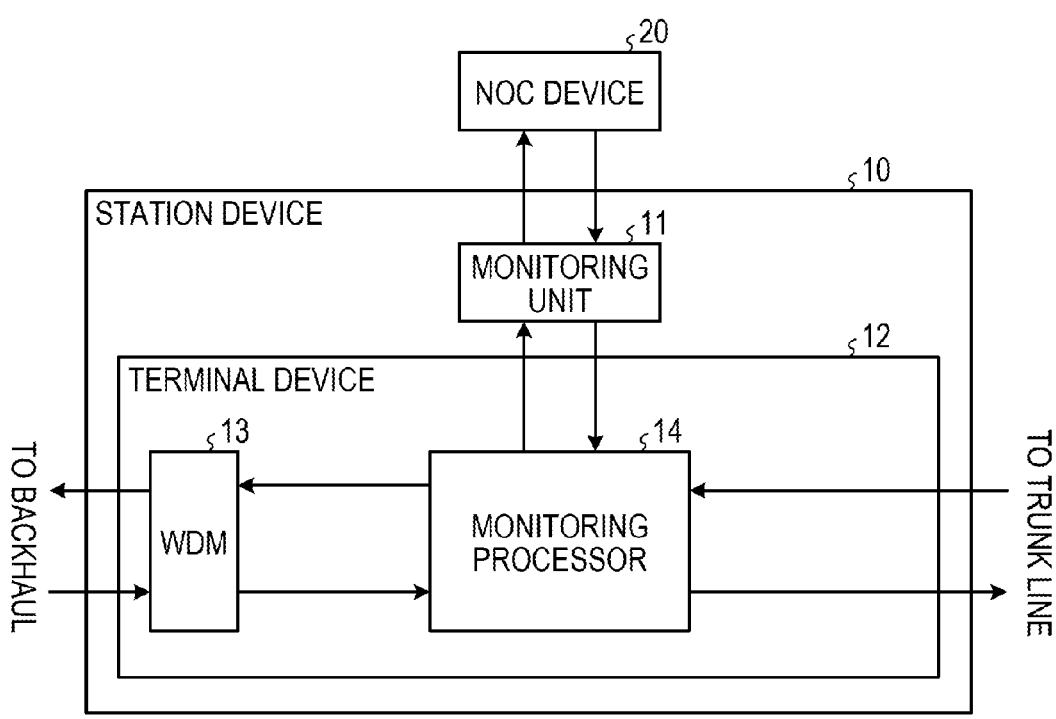
FIG. 2 is a block diagram illustrating an exemplary station device according to an embodiment.

FIG. 2 is a block diagram illustrating an exemplary station device according to an embodiment. Each of the station devices 10 is connected to the NOC device 20. Each of the station devices 10 includes a monitoring unit 11 and a terminal device 12.

The monitoring unit 11 is, for example, the system surveillance equipment (SSE). The terminal unit 12 is the submarine line terminal equipment (SLTE). A backhaul is, for example, an optical communication network laid on the ground.

The terminal device 12 includes the WDM 13 and a monitoring processor 14. The WDM 13 outputs a main signal obtained by multiplexing optical signals from the backhaul to the monitoring processor 14. Further, the WDM 13 divides the main signal from the monitoring processor 14 into the respective optical signals and sends out the optical signals to the backhaul.

According to a command from the NOC device 20 through the monitoring unit 11, the monitoring processor 14 superimposes a monitoring signal of a different frequency fx (x=A, B, . . . , and E) for each of the station devices 10 on the main signal from the WDM 13 and sends out the main signal to the trunk line 2 (see, e.g., FIGS. 1A and 1B). For example, the monitoring processor 14 of each of the station devices 10A to 10E superimposes a monitoring signal of each of frequencies fA to fE on the main signal to be sent out to the trunk line 2. For example, based on information from the monitoring unit 11, the monitoring processor 14 intensity-modulates the main signal by causing the main signal to fluctuate by, for example, an attenuator, and superimposes a monitoring signal on the main signal.

Further, the monitoring processor 14 extracts the monitoring signal of each of the frequencies from the signal received from the trunk line 2. The monitoring processor 14 transmits information of the extracted monitoring signal of each of the frequencies to the NOC device 20 through the monitoring unit 11.

Further, according to a command from the NOC device 20 through the monitoring unit 11, the monitoring processor 14 superimposes a command signal of an identical frequency f for all the station devices 10 on the main signal to be sent out to the trunk line 2. The command signal is a signal to monitor the state of each of the relay units 40A to 40E. The monitoring processor 14 sends out, to the trunk line 2, the main signal on which the command signal is superimposed designating any one of the relay units 40A to 40D as a destination.

The monitoring processor 14 extracts a response signal to the command signal from the signal received from the trunk line 2 and decodes the response signal. The monitoring processor 14 outputs information included in the decoded response signal to the monitoring unit 11. The response signal includes various parameters (e.g., a voltage and a temperature in each of the relay units 40) for a state of each of the relay units 40 which is a destination of the command signal. The monitoring unit 11 determines a presence or a non-presence of a failure occurrence in each of the relay units 40 or between the relay units 40 from the various parameters included in the response signal. After the determination, the monitoring unit 11 notifies the NOC device 20 of failure information about the presence or the non-presence of the failure occurrence in each of the relay units 40 or between the relay units 40.

[NOC Device]

Figure 3:
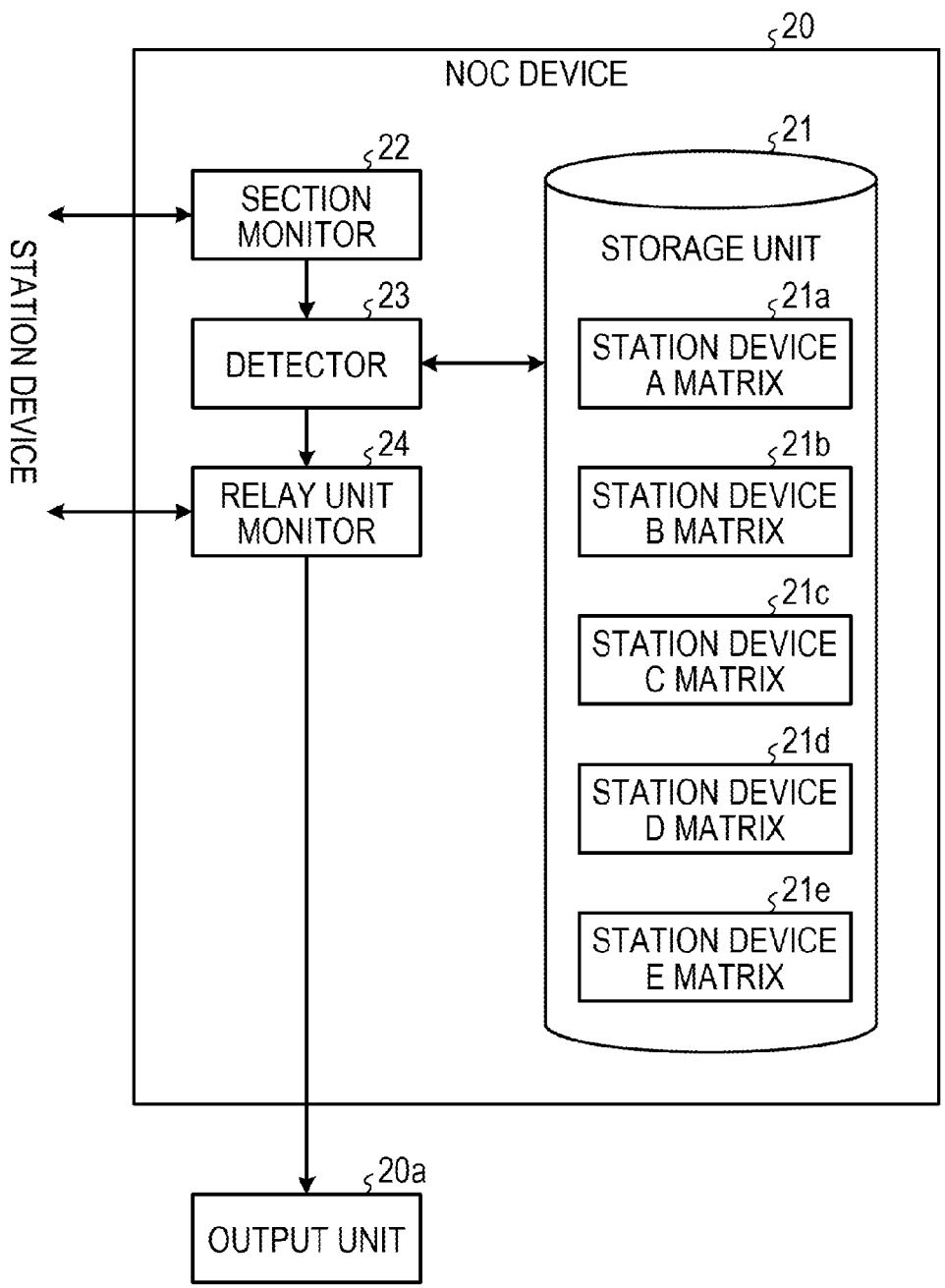
FIG. 3 is a block diagram illustrating an exemplary network operation center (NOC) device according to an embodiment.

FIG. 3 is a block diagram illustrating an exemplary NOC device according to an embodiment. The NOC device 20 according to an embodiment includes a storage unit 21, a section monitor 22, a detector 23, and a relay unit monitor 24.

As illustrated in FIG. 3, the storage unit 21 includes a station device A matrix 21a to a station device E matrix 21e.

FIG. 4A is a view illustrating an exemplary station device A matrix according to an embodiment. The station device A matrix 21a is a table from which the NOC device 20 determines a failure occurrence section depending on a reception status of the monitoring signals that the station device 10A receives from the station devices 10B to 10E (see, e.g., FIGS. 1A and 1B).

For example, when the station device 10A was not able to receive any of the monitoring signal of the frequency fB, the monitoring signal of the frequency fC, the monitoring signal of the frequency fD, and the monitoring signal of the frequency fE, the NOC device 20 determines that a failure has occurred in Section 1 (see, e.g., FIGS. 1A and 1B). That is, in FIG. 4A, it is determined that Section 1 is a failure occurrence section since Section 1 corresponds to the column that stores x in all the lines corresponding to the station device B (fB), the station device C (fC), the station device D (fD), and the station device E (fE). Sections 2 to 5, 7 and 9 are determined in the same manner.

FIG. 4B is a view illustrating an exemplary station device B matrix according to an embodiment. The station device B matrix 21b is a table from which the NOC device 20 determines a failure occurrence section depending on a reception status of the monitoring signals that the station device 10B receives from the station devices 10A and 10C to 10E (see, e.g., FIGS. 1A and 1B).

For example, when the station device 10B was unable to receive the monitoring signal of the frequency fA and thus received the monitoring signal of the frequency fC, the monitoring signal of the frequency fD, and the monitoring signal of the frequency fE, the NOC device 20 determines that a failure has occurred in Section 1. That is, in FIG. 4B, it is determined that Section 1 is a failure occurrence section since Section 1 corresponds to the column that stores x in the line corresponding to the station device A (fA) and stores ○ in the lines corresponding to the station device C (fC), the station device D (fD), and the station device E (fE). Sections 2 to 7 and 9 are determined in the same manner.

FIG. 4C is a view illustrating an exemplary station device C matrix according to an embodiment. The station device C matrix 21c is a table from which the NOC device 20 determines a failure occurrence section depending on a reception status of the monitoring signals that the station device 10C receives from the station devices 10A, 10B, 10D and 10E (see FIGS. 1A and 1B).

For example, when the station device 10C was unable to receive the monitoring signal of the frequency fA and thus received the monitoring signal of the frequency fB, the monitoring signal of the frequency fD, and the monitoring signal of the frequency fE, the NOC device 20 determines that a failure has occurred in Section 1. That is, in FIG. 4C, it is determined that Section 1 is a failure occurrence section since Section 1 corresponds to the column that stores x in the line corresponding to the station device A (fA) and stores ○ in the lines corresponding to the station device B (fB), the station device D (fD), and the station device E (fE). Sections 2 to 4 and 6 to 9 are determined in the same manner.

FIG. 4D is a view illustrating an exemplary station device D matrix according to an embodiment. The station device D matrix 21d is a table from which the NOC device 20 determines a failure occurrence section depending on a reception status of the monitoring signals that the station device 10D receives from the station devices 10A to 10C, and 10E (see, e.g., FIGS. 1A and 1B).

For example, when the station device 10D was unable to receive the monitoring signal of the frequency fA and thus received the monitoring signal of the frequency fB, the monitoring signal of the frequency fC, and the monitoring signal of the frequency fE, the NOC device 20 determines that a failure has occurred in Section 1. That is, in FIG. 4D, it is determined that Section 1 is a failure occurrence section since Section 1 corresponds to the column that stores x in the line corresponding to the station device A (fA) and stores ○ in the lines corresponding to the station device B (fB), the station device C (fC), and the station device E (fE). Sections 2 to 4, 6 and 8 to 10 are determined in the same manner.

FIG. 4E is a view illustrating an exemplary station device E matrix according to an embodiment. The station device E matrix 21e is a table from which the NOC device 20 determines a failure occurrence section depending on a reception status of the monitoring signals that the station device 10E receives from the station devices 10A to 10D (see, e.g., FIGS. 1A and 1B).

For example, when the station device 10E was unable to receive the monitoring signal of the frequency fA and thus received the monitoring signal of the frequency fB, the monitoring signal of the frequency fC, and the monitoring signal of the frequency fD, the NOC device 20 determines that a failure has occurred in Section 1. That is, in FIG. 4E, it is determined that Section 1 is a failure occurrence section since Section 1 corresponds to the column that stores x in the line corresponding to the station device A (fA) and stores ○ in the lines corresponding to the station device B (fB), the station device C (fC), and the station device D (fD). Sections 2 to 4, 6, 8, and 10 are determined in the same manner.

The section monitor 22 instructs each of the monitoring units 11 of the station devices 10A to 10E to superimpose a monitoring signal of a different frequency fx (x=A, B, . . . , and E) for each of the station devices 10A to 10E on the main signal to be sent out by the terminal device 12 to the trunk line 2. Further, the section monitor 22 outputs, to the detector 23, the reception status of the monitoring signals received from the monitoring units 11 of the station devices 10A to 10E.

The detector 23 refers to each of the station device A matrix 21a to the station device E matrix 21e, based on the reception status of the monitoring signals received from the monitoring units 11 of the station devices 10A to 10E as output from the section monitor 22. Then, the detector 23 determines in which of Sections 1 to 10 a failure occurs, based on overall results obtained by referring to each of the station device A matrix 21a to the station device E matrix 21e, so as to determine a failure occurrence section. The detector 23 outputs the detection result of the failure occurrence section to the relay unit monitor 24.

Based on the detection result of the failure occurrence section output from the detector 23, the relay unit monitor 24 instructs a station device 10 located closest to the corresponding section to sequentially transmit a command signal to the relay units 40 included in the corresponding section in an order close to the corresponding station device 10. Then, the relay unit monitor 24 receives, from the station device 10, failure information about a relay unit 40 that is determined to be involved in a failure occurrence or failure information about a GEQ, a cable and so on between relay units 40 that are estimated to be involved in a failure occurrence, by the station device 10 that has received response signals from the relay units 40 of the corresponding section. Then, the relay unit monitor 24 outputs, from the output unit 20a, the failure information received from the station device 10.

For example, when a failure occurrence is detected, a state confirmation of the relay units 40 is first performed by the station device 10 located closest to the failure occurrence section, in order to determine in which part of the trunk line 2 (e.g., the cables, the relay units, the GEQs, and the BUs) the failure occurs (FIGS. 1A and 1B). The state confirmation is performed in an order starting from a relay unit located closest to the corresponding station device 10. When the states of the relay units 40 have no problem, the station device 10 may determine that no line disconnection occurs between the station device 10 and the relay units 40. When the states of the relay units 40 are not confirmed, the station device 40 may determine that a line disconnection occurs between a relay unit 40 of which state is confirmed and a relay unit 40 of which state is not confirmed.

For example, when a determination is output from the detector 24 that Section 1 is a failure occurrence section, the relay unit monitor 24 instructs the station device 10A located closest to Section 1 to transmit a command signal to the relay unit 40A included in Section 1. Then, the relay unit monitor 24 receives, from the station device 10A, information about the relay unit 40A that is determined to be involved in the failure occurrence by the station device 10A that has received a response signal from the relay unit 40A included in Section 1. The relay unit monitor 24 outputs, from the output unit 20a, the information about the relay unit 40A that is determined to be involved in the failure occurrence as received from the station device 10A.

Meanwhile, when a plurality of station devices 10A to 10C exist as station devices 10 closest to a corresponding section as in Section 2 (see, e.g., FIGS. 1A and 1B), the relay unit monitor 24 instructs one of the station devices 10A to 1C to transmit a command signal to the relay units 40 of the corresponding section.

[Relay Units]

Figure 5:
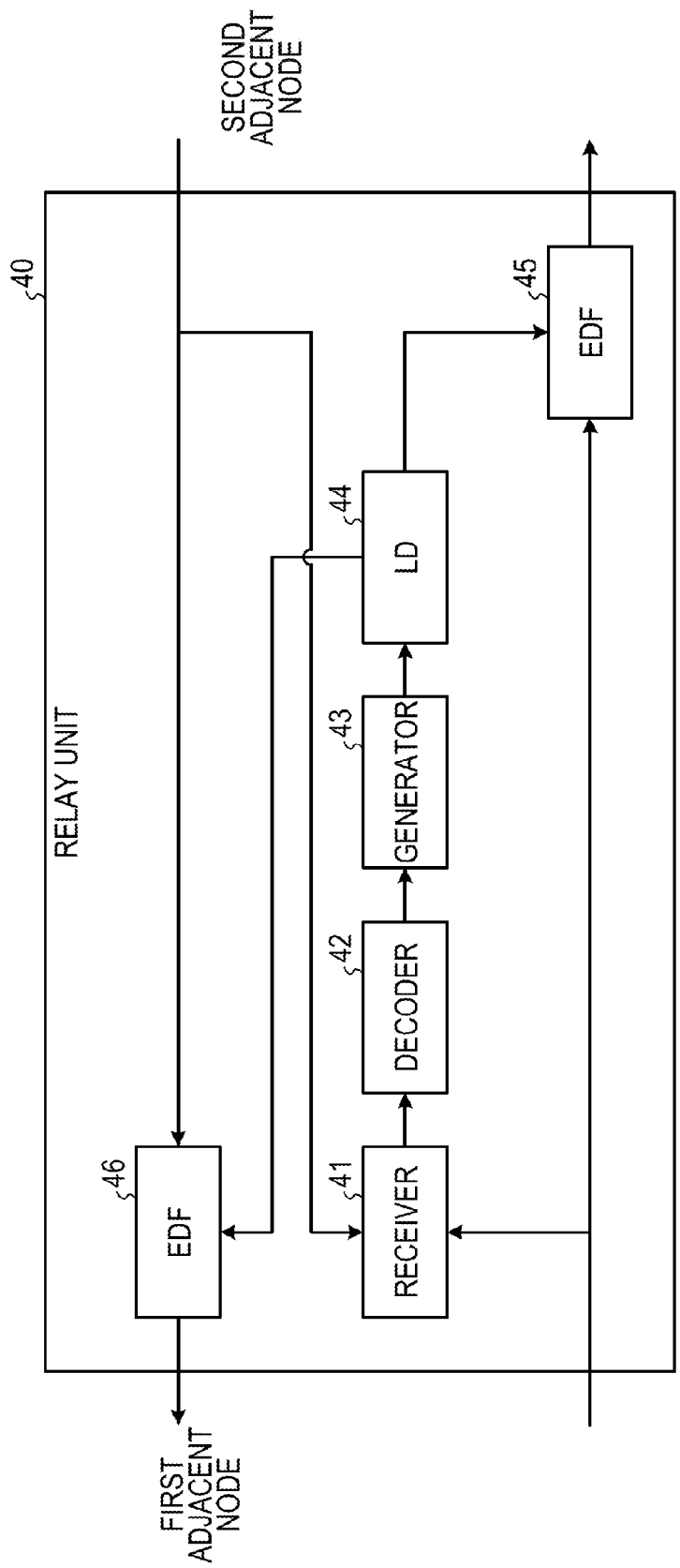
FIG. 5 is a block diagram illustrating an exemplary relay unit according to an embodiment.

FIG. 5 is a block diagram illustrating an exemplary relay unit according to an embodiment. The relay unit 40 is connected to first and second adjacent nodes. Each of the adjacent nodes is any one of the station devices 10, the BUs 30, the other relay units 40, and the GEQs.

Each of the relay units 40 includes a receiver 41, a decoder 42, a generator 43, a laser diode (LD) 44, and erbium doped fibers (EDF) 45 and 46. The receiver 41 receives a signal branched from a main signal input from the first adjacent node before the main signal is input to the EDF 45. The receiver 41 outputs the received signal to the decoder 42. Meanwhile, the main signal input from the first adjacent node is amplified by optical-optical conversion by the EDF 45 and output to the second adjacent node.

The decoder 42 decodes the signal output from the receiver 42 and extracts a command signal when the output signal includes the command signal. When the extracted command signal is a command signal addressed to the decoder 42 itself, the decoder 42 notifies the generator 43 of the reception of the command signal addressed to the decoder 42. When the signal output from the receiver 41 includes no command signal or when the extracted command signal is not a command signal addressed to the decoder 42 itself, the decoder 42 does not perform the notification to the generator 43.

The generator 43 receives the notification from the decoder 42 and generates a response signal including parameters of the relay unit 40 of the decoder 43 such as, for example, a voltage and a temperature. Then, the generator 43 outputs the generated response signal to the LD 44. The LD 44 optically amplifies the response signal output from the generator 43 and outputs the amplified response signal to the EDF 45. The EDF 45 superimposes the response signal output from the LD 44 on the main signal and amplifies the main signal by an optical-optical conversion to output the amplified main signal to the second adjacent node.

Further, the receiver 41 receives a signal branched from a main signal input from the second adjacent node before the main signal is input to the EDF 46. The receiver 41 outputs the received signal to the decoder 42. Meanwhile, the main signal input from the second adjacent node is amplified by the optical-optical conversion by the EDF 46 and output to the first adjacent node.

Then, the response signal that has undergone the above-described processes by the decoder 42 and the generator 43 is output to the LD 44. The LD 44 optically amplifies the response signal output from the generator 43 and outputs the response signal to the EDF 46. The EDF 46 superimposes the response signal output from the LD 44 on the main signal and amplifies the main signal by optical-optical conversion to output the amplified main signal to the first adjacent node.

[Section Monitoring Process]

Figure 6A:
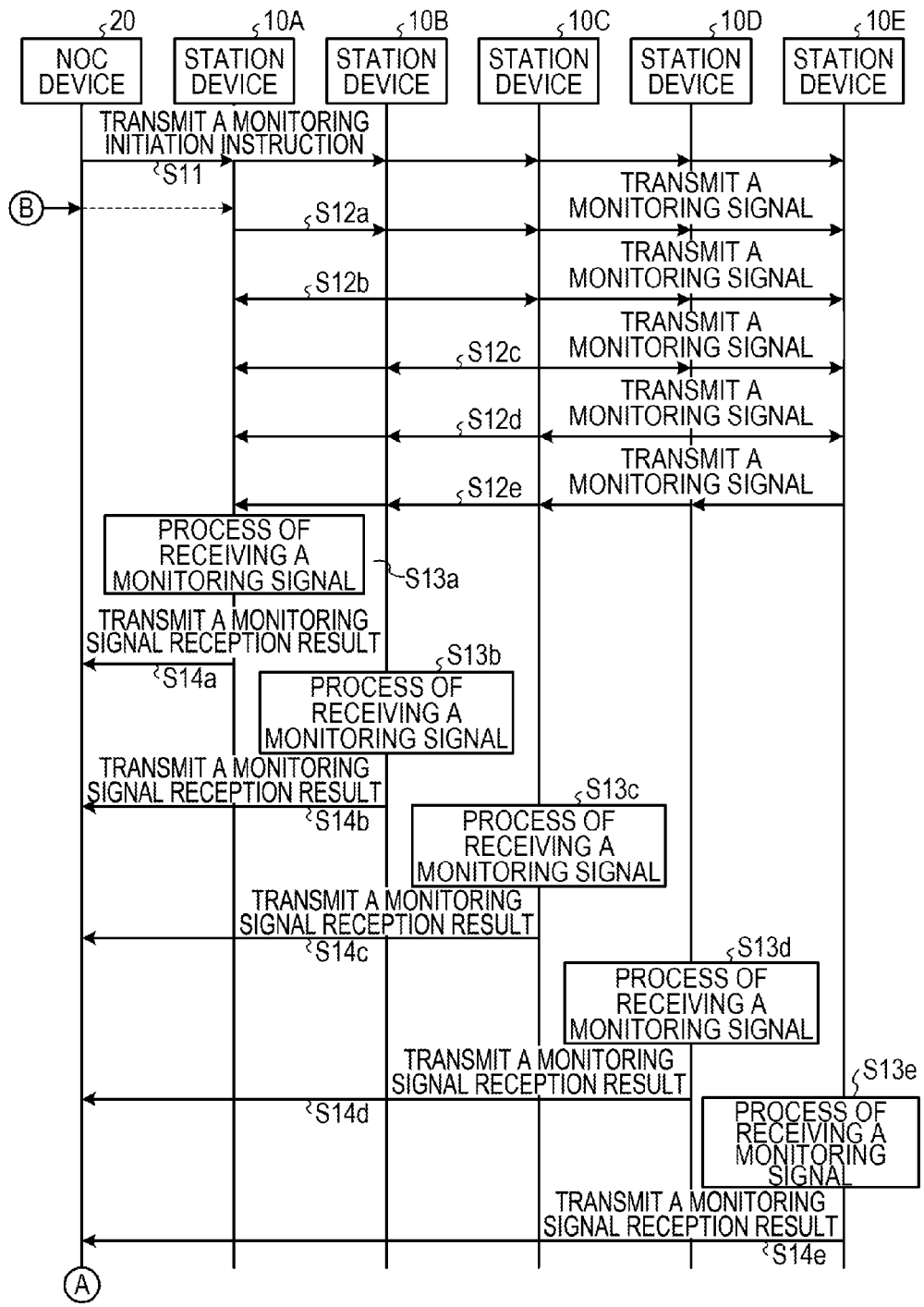
FIG. 6A is a sequence diagram illustrating an exemplary monitoring process according to an embodiment (example 1)
Figure 6B:
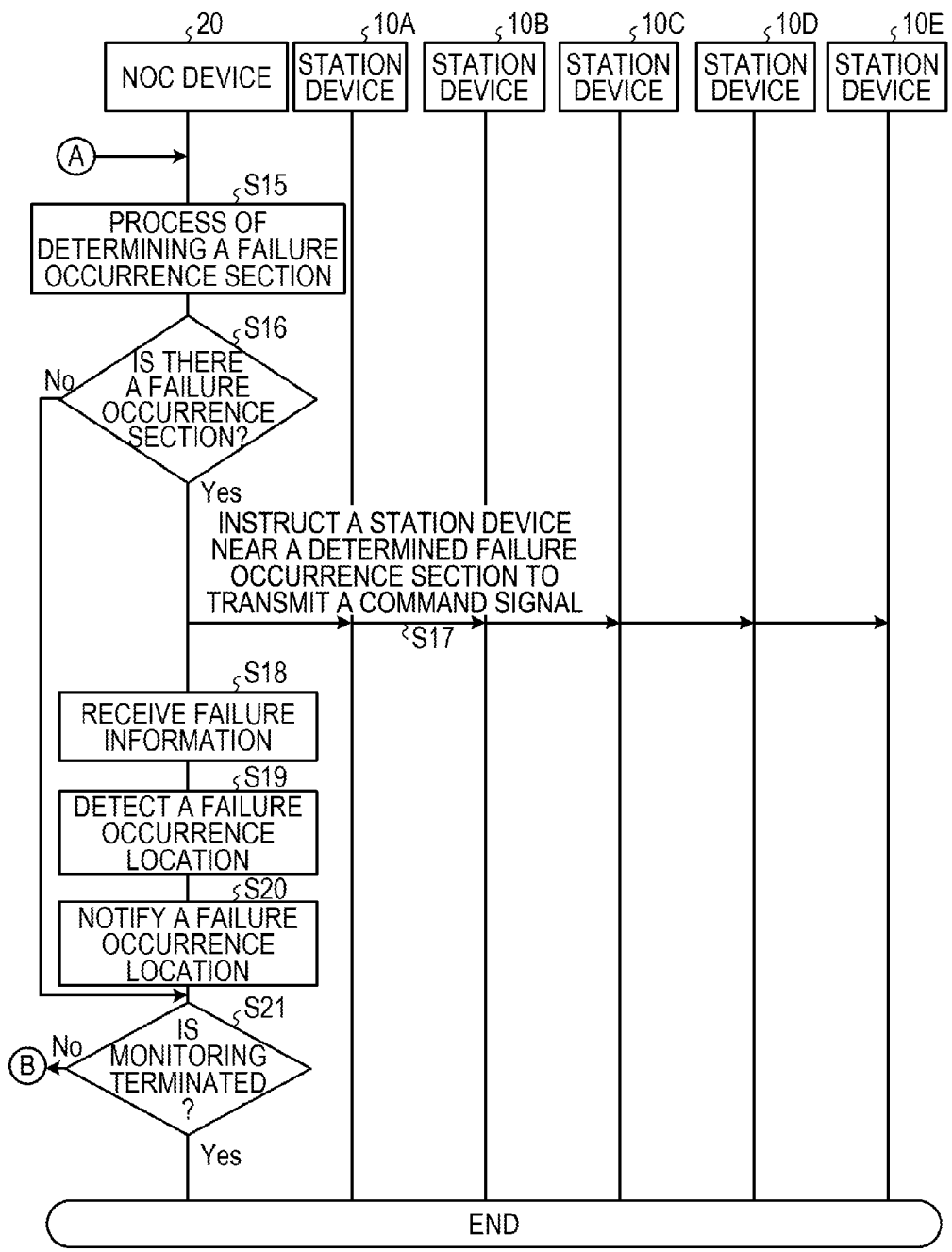
FIG. 6B is a sequence diagram illustrating an exemplary monitoring process according to an embodiment (example 2)

FIGS. 6A and 6B are sequence diagrams illustrating an exemplary monitoring process according to an embodiment. In FIG. 6A, the NOC device 20 first transmits a monitoring initiation instruction to each of the station devices 10A to 10E (operation S11). Next, each of the station devices 10A to 10E that have received the monitoring initiation instructions from the NOC device 20 superimposes a monitoring signal of each of the frequencies fA to fE allocated to the station devices 10A to 10E, respectively, on the main signal and transmits the monitoring signal to the other station devices 10A to 10E (operations S12a to S12e).

The station device 10A performs a receiving of the monitoring signals of the frequencies fB to fE from the other station devices 10B to 10E (operation S13a). Specifically, the station device 10A extracts the monitoring signals of the frequencies fB to fE allocated to the other station devices 10B to 10E, respectively, from the signals received from the other station devices 10B to 10E. Then, the station device 10A transmits a monitoring signal reception result as to which of the monitoring signals of the frequencies fB to fE could have been received and could not have been received, to the NOC device 20 (operation S14a). For example, when the station device 10A was not able to receive any of the monitoring signals of the frequencies fB to fE, the monitoring signal reception result is information representing that the station device B (fB)→x, the station device C (fC)→x, the station device D (fD)→x, and the station device E (fE)→x. For example, when the monitoring signal reception result is received representing that the station device B (fB)→x, the station device C (fC)→x, the station device D (fD)→x, and the station device E (fE)→x, the NOC device 20 may determine, from the station device A matrix 21a (see, e.g., FIG. 4A), that Section 1 is a failure occurrence section.

Likewise, the station device 10B performs a receiving of the monitoring signals of the frequencies fA and fC to fE from the other station devices 10A and 10C to 10E, respectively (operation S13b). Specifically, the station device 10B extracts the monitoring signals of the frequencies fA and fC to fE allocated to the other station devices 10A and 10C to 10E, respectively, from the signals received from the other station devices 10A and 10C to 10E. Then, the station device 10B transmits a monitoring signal reception result as to which of the monitoring signals of the frequencies fA and fC to fE could have been received and could not have been received, to the NOC device 20 (operation 514b). For example, when the station device 10B was unable to receive the monitoring signal of the frequency fA and thus received the monitoring signals of the frequencies fC to fE, the monitoring signal reception result is information representing that the station device A (fA)→x, the station device C (fC)→○, the station device D (fD)→○, and the station device E (fE)→○. For example, when the monitoring signal reception result is received representing that the station device A (fA)→x, the station device C (fC)→○, the station device D (fD)→o, and the station device E (fE)→o, the NOC device 20 may determine, from the station device B matrix 21b (see FIG. 4B), that Section 1 is a failure occurrence section.

Likewise, the station device 10C performs a receiving of the monitoring signals of the frequencies fA, fB, fD, and fE from the other station devices 10A, 10B, 10D, and 10E (operation S13c). Specifically, the station device 10C extracts the monitoring signals of the frequencies fA, fB, fC, and fE allocated to the other station devices 10A, 10B, 10D, and 10E, respectively, from the signals received from the other station devices 10A, 10B, 10D, and 10E. Then, the station device 10C transmits a monitoring signal reception result as to which of the monitoring signals of the frequencies fA, fB, fD, and fE could have been received and could not have been received, to the NOC device 20 (operation S14c). For example, when the station device 10C was unable to receive the monitoring signal of the frequency fA and thus received the monitoring signals of the frequencies fB, fD, and fE, the monitoring signal reception result is information representing that the station device A (fA)→x, the station device B (fB)→o, the station device D (fD)→o, and the station device E (fE)→o. For example, when the monitoring signal reception result is received representing that the station device A (fA)→x, the station device B (fB)→o, the station device D (fD)→o, and the station device E (fE)→o, the NOC device 20 may determine, from the station device C matrix 21c (see, e.g., FIG. 4C), that Section 1 is the failure occurrence section.

Likewise, the station device 10D performs a receiving of the monitoring signals of the frequencies fA to fC and fE from the other station devices 10A to 10C and 10E (operation S13d). Specifically, the station device 10D extracts the monitoring signals of the frequencies fA to fC and fE allocated to the other station devices 10A to 10C and 10E, respectively, from the signals received from the other station devices 10A to 10C and 10E. Then, the station device 10D transmits a monitoring signal reception result as to which of the monitoring signals of the frequencies fA to fC and fE could have been received and could not have been received, to the NOC device 20 (operation 514d). For example, when the station device 10D was unable to receive the monitoring signal of the frequency fA and thus received the monitoring signals of the frequencies fB, fC, and fE, the monitoring signal reception result is information representing that the station device A (fA)→x, the station device B (fB)→o, the station device C (fC)→o, and the station device E (fE)→o. For example, when the monitoring signal reception result is received representing that the station device A (fA)→x, the station device B (fB)→o, the station device C (fC)→o, and the station device E (fE)→o, the NOC device 20 may determine, from the station device D matrix 21d (see, e.g., FIG. 4D), that Section 1 is a failure occurrence section.

Likewise, the station device 10E performs a receiving of the monitoring signals of the frequencies fA to fD from the other station devices 10A to 10D (operation S13e). Specifically, the station device 10E extracts the monitoring signals of the frequencies fA to fD allocated to the other station devices 10A to 10D, respectively, from the signals received from the other station devices 10A to 10D. Then, the station device 10E transmits a monitoring signal reception result as to which of the monitoring signals of the frequencies fA to fD could have been received and could not have been received, to the NOC device 20 (operation S14e). For example, when the station device 10D was unable to receive the monitoring signal of the frequency fA and thus received the monitoring signals of the frequencies fB and fD, the monitoring signal reception result is information representing that the station device A (fA)→x, the station device B (fB)→o, the station device C (fC)→o, and the station device D (fD)→o. For example, when the monitoring signal reception result is received representing that the station device A (fA)→x, the station device B (fB)→o, the station device C (fC)→o, and the station device D (fD)→o, the NOC device 20 may determine, from the station device E matrix 21e (see, e.g., FIG. 4E), that Section 1 is a failure occurrence section.

Next, in FIG. 6B, the NOC device 20 performs a determining of a failure occurrence section, based on the monitoring signal reception result received from each of the station devices 10A to 10E in the operations S14a to S14e (operation S15). Next, the NOC device 20 determines whether there is a failure occurrence section, as a result of the determination of a failure occurrence section in the operation S15 (operation 16). When it is determined that there is a failure occurrence section (operation S16: Yes), the NOC device 20 proceeds to an operation S17. When it is determined that there is no failure occurrence section (operation S16: No), the NOC device 20 proceeds to an operation S21.

In the operation S17, the NOC device 20 transmits a command signal transmission instruction to a station device 10 near the failure occurrence section determined in the operation S15. Next, the NOC device 20 receives failure information about the failure in a relay unit 40 or between relay units 40 that is determined by the station device 10 based on response signals including various parameters as received from the relay units 40 in response to the command signal (operation S18). Next, the NOC device 20 detects a failure occurrence location from the failure information representing in which section and in which equipment the failure occurs as received in the operation S18 (operation S19). Next, the NOC device 20 outputs the failure occurrence location detected in the operation S19 from the output unit 20a (see, e.g., FIG. 3) to notify the location (operation S20).

Next, in an operation S21, the NOC device 20 determines whether or not the monitoring is terminated. When the monitoring is terminated (operation S21: Yes), the NOC device 20 terminates the monitoring process. When the monitoring is not terminated (operation S21: No), the NOC device 20 proceeds to the process in which the station devices 10A to 10E are in the waiting state to receive the monitoring signal reception result. When the monitoring is not terminated (operation S21: No), the NOC device 20 may proceed to the operation S11 so as to transmit the monitoring initiation instruction to the station devices 10A to 10E once again. That is, each of the station devices 10A to 10E may superimpose a monitoring signal of each of the frequencies fA to fE allocated to the station devices 10A to 10E, respectively, on the main signal, and perform the processes of the operations S12a to S12e to transmit the monitoring signal to the other station devices 10A to 10E.

Meanwhile, the process order of the operations S12a to S14e may be inverted, except for each of the orders of 12a→S13a→S14a, S12b→S13b→S14b, S12c→S13c→S14c, S12d→S13d→S14d, and S12e→S13e→S14e.

[Exemplary Process of Determining Failure Occurrence Section]

FIG. 7A is a diagram illustrating an exemplary outline of a process of determining a failure occurrence section according to an embodiment. FIG. 7A represents a case where a failure occurs in the trunk line 2 (× in FIG. 7A). First, each of the station devices 10A to 10E confirms the communication state with the other station devices 10. As a result, it is confirmed that the station device 10A is able to communicate with the station devices 10B and 10C, the station device 10B is able to communicate with the station devices 10A and 10C, the station device 10C is able to communicate with the station devices 10A and 10B, the station device 10D is able to communicate with the station device 10E, and the station device 10E is able to communicate with the station device 10D. Then, each of the station devices 10A to 10E transmits the communication state to the NOC device 20 (see, e.g., FIGS. 1A and 1B).

The NOC device 20 compares the communication states of the station devices 10A to 10E with the station device A matrix 21a to the station device E matrix 21e, respectively, and determines that Section 3 is a failure occurrence section. Then, the NOC device 20 instructs a station device 10 near Section 3, e.g., the station device 10E, to transmit a command signal to each of the relay units 40 of Section 3, so as to specify a failure occurrence location.

FIG. 7B is a diagram illustrating an exemplary outline of a process of determining a failure occurrence section according to an embodiment (example 2). FIG. 7B represents a case where a failure occurs in the branch line 3D (× in FIG. 7B). First, each of the station devices 10A to 10E confirms the state of communication with the other station devices 10. As a result, it is confirmed that the station device 10A is able to communicate with the station devices 10B, 10C, and 10E, the station device 10B is able to communicate with the station devices 10A, 10C, and 10E, the station device 10C is able to communicate with the station devices 10A, 10B, and 10E, and the station device 10E is able to communicate with the station devices 10A to 10C. Further, it is confirmed that the station device 10D is able to communicate with none of the station devices 10. Then, the station devices 10A to 10E transmit the communication states to the NOC device 20 (see, e.g., FIGS. 1A and 1B).

The NOC device 20 compares the communication states of the station devices 10A to 10E with the station device A matrix 21a to the station device E matrix 21e, respectively, and determines that Section 7 is a failure occurrence section. Then, the NOC device 20 instructs a station device 10 near Section 7, e.g., the station device 10D, to transmit a command signal to each of the relay units 40 of Section 7, so as to specify a failure occurrence location.

[Exemplary Process of Detecting Failure Occurrence Location]

Figure 8:
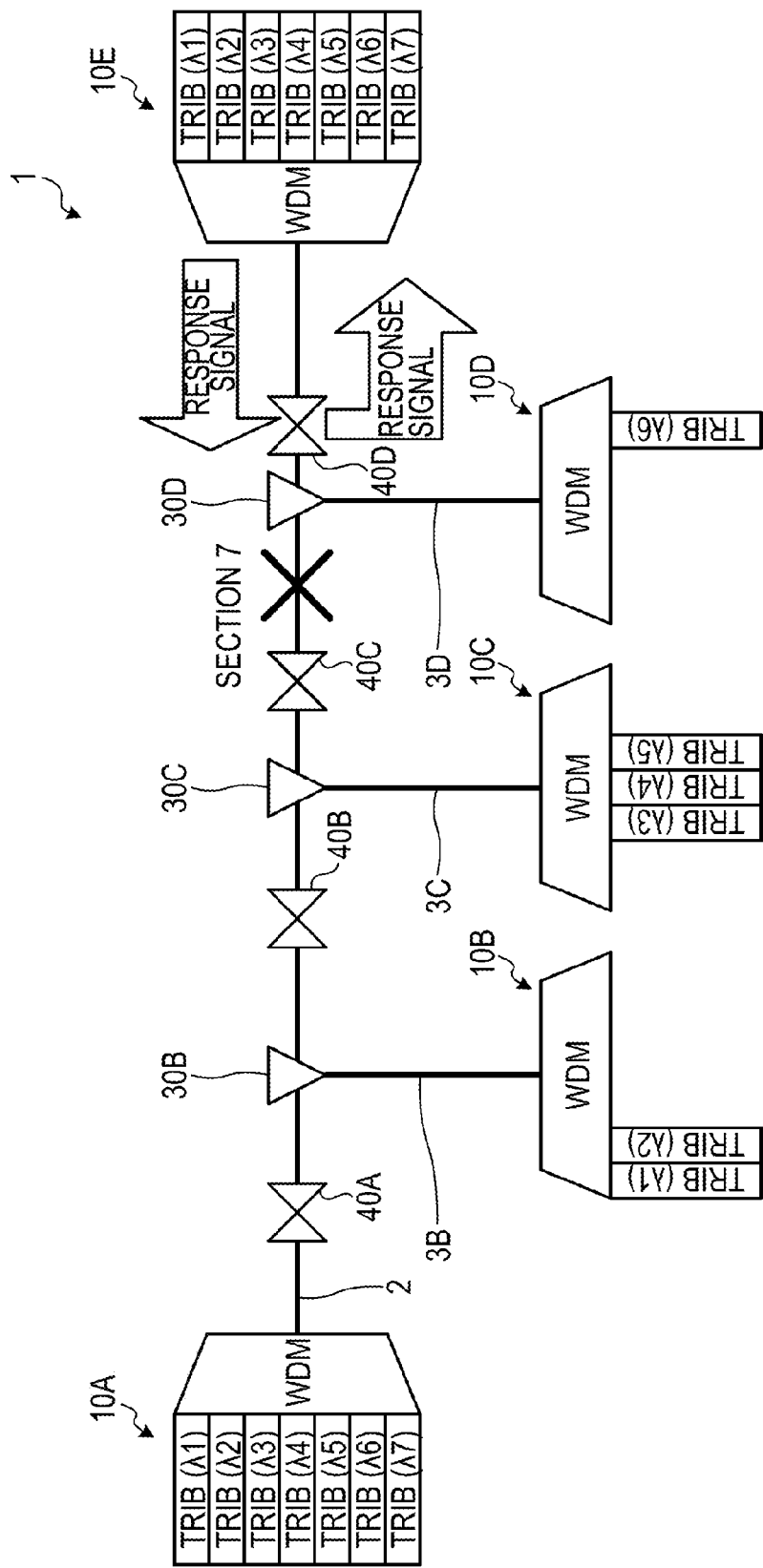
FIG. 8 is a diagram illustrating an exemplary outline of a process of detecting a failure occurrence location according to an embodiment.

FIG. 8 is a view illustrating an exemplary outline of a process of detecting a failure occurrence location according to an embodiment. In the optical network system 1, the process of detecting a failure occurrence location is performed according to a presence or a non-presence of a response signal to a command signal transmitted to each of the relay units 40 from the station devices 10. The transmission of the command signal to each of the relay units 40 is performed by amplitude modulation (AM) of a main signal. However, since an identical frequency is used as the modulation frequency for all the relay units 40, the modulations may not be performed at the same time. Hence, when a communication failure occurs in the optical network system 1, one of the station devices 10 is instructed to transmit a command signal to each of the relay units 40.

For example, as illustrated in FIG. 8, when a failure occurs in Section 7, and the occurrence of the failure in Section 7 is determined in advance by the process of determining a failure occurrence section, the station device 10E closest to Section 7 is instructed to transmit a command signal to each of the relay units 40. Accordingly, detection of a failure occurrence location may be more quickly performed.

Meanwhile, according to a conventional failure detecting method, when a failure occurs in Section 7, the occurrence of the failure in Section 7 may not be determined in advance. Thus, the station device 10A is instructed to transmit a command signal to each of the relay units 40. When the detection of a failure occurrence location is performed in this way, command signals are transmitted to relatively more relay units 40, and a command signal is transmitted to each of the relay units 40 of Section 7 after repetition of the transmission of the command signals and the reception of response signals thereto. Hence, the detection of a failure occurrence location may not be quickly performed.

Further, according to the conventional failure detecting method, it is assumed that a failure occurrence refers to a case where a signal disconnection occurs in all wavelengths between the station devices 10 conducting a communication. In FIG. 8, it is assumed that the station devices 10A, 10B, and 10E communicate with each other with signals of wavelengths $\lambda 1$ and $\lambda 2$. In FIG. 8, it is assumed that the station devices 10A, 10C, and 10E communicate with each other with signals of wavelengths $\lambda 3$ to $\lambda 5$. In FIG. 8, it is assumed that the station devices 10A, 10D, and 10E communicate with each other with a signal of a wavelength $\lambda 6$. In FIG. 8, it is assumed that the station devices 10A and 10E communicate with each other with a signal of a wavelength $\lambda 7$.

In this case, according to the conventional failure detecting method, when a failure occurs in Section 7, a signal disconnection occurs in the communication of the wavelength $\lambda 6$ with the station device 10D and the communication of the wavelength $\lambda 7$ with the station device 10D. That is, since the signal disconnection occurs in all the wavelengths between the station devices 10, the station device 10A recognizes that a failure occurs with respect to the communication of the wavelengths $\lambda 6$ and $\lambda 7$. However, for example, when a signal disconnection occurs only in the communication of the wavelength $\lambda 3$, the station device 10A does not recognize that a failure occurs since the communication with the station device 10C may be conducted with the wavelengths $\lambda 4$ and $\lambda 5$, which does not correspond to a signal disconnection of all wavelengths between the station devices 10.

In addition, an output power of each of the relay units 40 is controlled to be always a constant value even when the number of wavelengths of a signal is reduced due to a failure. Thus, when the number of wavelengths of a signal is reduced, signal powers equal to the reduced number of wavelengths are allocated to signal powers of the remaining wavelengths so that the signal powers of the remaining wavelengths increase. Accordingly, a transmission penalty may increase by, for example, a fiber non-linear effect, and the lines of the remaining wavelengths may also be disconnected. Therefore, more time is required for the failure occurrence location detection.

For example, as illustrated in FIG. 8, when a failure occurs in Section 7, the number of wavelengths received by the station device 10E is one which is the wavelength $\lambda 6$. The signal powers of the reduced wavelengths $\lambda 1$ to $\lambda 5$ and $\lambda 7$ are allocated to the signal power of the wavelength $\lambda 6$ so that the signal power of the wavelength $\lambda 6$ may become 7 times of that prior to the failure occurrence. As a result, the signal of the wavelength $\lambda 6$ may also be subject to the line disconnection. Accordingly, the station device 10E incorrectly recognizes that a failure occurs in a location closest to the station device 10E on the trunk line 2. Hence, the station device 10E sequentially performs the state confirmation starting from a relay unit 40 closest to the station device 10E, thereby requiring time for the failure occurrence location detection.

Further, the optical network system 1 adopts an optical add drop multiplexer (OADM) in order to reduce system construction costs. By performing a branching in a wavelength unit through the OADM, a network topology may be flexibly implemented. Meanwhile, by adopting the OADM, the optical network system 1 consolidates signals of various organizations or institutions into one optical fiber cable. However, the optical network system 1 is unable to monitor communication systems of organizations or institutions other than the communication system of the organization or institution of the optical network system 1. Thus, in the conventional failure detecting method, even when an upgrade is made to communication systems of other organizations or institutions, the optical network system 1 is unable to monitor the line state of the communication systems of other organizations or institutions so that detection of a location of a failure occurrence due to disconnection in all lines may not be performed in a timely manner. According to the conventional failure detecting method, the failure occurrence location detection is not performed until an individual organization or institution which manages a communication system thereof personally recognizes the failure occurrence.

As described above, the conventional failure detecting method is unable to automatically and quickly perform the failure occurring location detection. In contrast, the embodiment of the present disclosure is able to automatically and quickly perform the failure occurring location detection.

[Exemplary Application of Embodiment]

FIG. 9 is a view illustrating an exemplary application of the present embodiment. The optical network system 1 of the present embodiment may be applied to an optical submarine system. The optical submarine system is a system in which a cable adopting an optical fiber as a transmission medium is installed along a submarine topography so as to conduct a communication to connect ground station devices with each other. Since the optical submarine system conducts a large-capacity communication, it performs a transmission by binding different wavelengths of about 80 waves in one optical fiber.

The optical submarine system performs a long-distance transmission by repeating optical amplification at an appropriate interval on a transmission line of thousands to ten thousand or more kilometers. The optical submarine system has a system lifetime of about 25 years and requires high reliability. Further, the optical submarine system requires much time and costs for construction of new facilities or facility repair when a failure occurs. In the optical submarine system, since frequently used communication transmission lines are consolidated into one optical fiber cable, an occurrence of a failure in the optical submarine system results in a large social influence.

The station devices 10A to 10E illustrated in FIG. 9 are called ground stations. The station device 10A includes a synchronous digital hierarchy (SDH) interconnection equipment (SIE)/network protection equipment (NPE) 101A. The station device 10A also includes a 10G_WDM_SLTE 102A. The station device 10A also includes a 100G_WDM_SLTE 103A. The station device 10A also includes a power feed equipment (FFE) 104A. The station device 10A also includes a cable terminate box (CTB) 105A. The station device 10A also includes a network management system (NMS) 106A. The station device 10A also includes a SSE 107A. Likewise, the station device 10E includes an SIE/NPE 101E, a 10G_WDM_SLTE 102E, a 100G_WDM_SLTE 103E, a PFE 104E, a CTB 105E, an NMS 106E, and an SSE 107E. Although not illustrated, the station devices 10B to 10D also have similar configuration to that of each of the station devices 10A and 10E.

The SIE/NPE 101A connects the 10G_WDM_SLTE 102A and the 100G_WDM_SLTE 103A within the station device 10A with a synchronous optical network (SONET)/SDH network, which is a backhaul.

The 10G_WDM_SLTE 102A sends out a main signal of 10 Gbps with which a signal from the backhaul through the SIE/NPE 101A is multiplexed, to the trunk line 2. Further, the 10G_WDM_SLTE 102A outputs a signal directed toward the backhaul, from which the main signal of 10 Gbps from the trunk line 2 is separated, to the SIE/NPE 101A.

The 100G_WDM_SLTE 103A transmits a main signal of 100 Gbps with which a signal from the backhaul through the SIE/NPE 101A is multiplexed, to the trunk line 2. Further, the 100G_WDM_SLTE 103A outputs a signal directed toward the backhaul, from which the main signal of 10 Gbps from the trunk line 2 is separated, to the SIE/NPE 101A.

Meanwhile, it has been recently predominant to upgrade an existing system optimized with a 10 Gbps signal to incorporate a 100 Gbps signal. That is, without making a change in the submarine equipment, a component is added to a station device 10 so as to be in a form that appears to coexist with the existing system. For example, the station device 10A has a configuration in which the 100G_WDM_SLTE 103A is added to the already operating 10G_WDM_SLTE 102A, and a new wavelength is additionally established besides the existing wavelengths.

The PFE 104A supplies a power to each of the components within the station device 10A, and furthermore, supplies a power to the submarine equipment on the trunk line 2 such as, for example, the BUs 30 and the relay units 40, through the trunk line 2. The CTB 105A terminates the trunk line 2. The NMS 106A performs a monitoring of the state of the optical network system 1. The SSE 107A performs a monitoring of the system information of the optical network system 1.

The present embodiment may be applied to the SSE 106A and the existing 10G_WDM_SLTE 102A within the station device 10A, and the NOC device 20 (see, e.g., FIGS. 1A to 3). As in the station device 10A, the present embodiment may also be similarly applied to the station devices 10B to 10E. Thus, the present embodiment may be applied, regardless of whether the station devices 10A to 10E are upgraded to the 100 Gbps signal.

According to the above-described embodiment, after a failure occurrence section is determined in advance, a station device 10 near the failure occurrence section is instructed to transmit a command signal to the relay units 40. Thus, the failure occurrence location detection may be more quickly performed. According to the above-described embodiment, the time required for the failure occurrence location detection may be reduced to, for example, the maximum of 1/(2n−3) times (n is the number of the station devices 10 included in the optical network system 1).

According to the above-described embodiment, even when a failure occurs, and the balance of the optical power of the entire optical network system 1 collapses so that a secondary line disconnection occurs in a section that has not been subject to the line disconnection, the failure occurrence location detection may be performed.

In the optical network system 1, even when an upgrade is made to communication systems of other organizations or institutions, the failure occurrence location detection may be performed, regardless of the upgrade.

Second Embodiment

[Networks]

In the first embodiment, the network topology of the optical network system 1 is the fish-bone type in which station devices are disposed on opposite sides, respectively, to be connected to each other by an optical submarine cable, and station devices are further disposed on the grounds of endpoints of cables branched from the optical submarine cable. However, in the second embodiment, the network topology of the optical network system 1 is not limited to the fish-bone type, and other network topologies such as, for example, a point-to-point type, a ring type, and a festoon type may be applied. In the second embodiment, an optical network may be applied in which, for example, the fish-bone type, the point-to-point type, the ring type, and the festoon type are combined with one another.

The point-to-point type is a network topology in which station devices are disposed on opposite sides, respectively, to be connected to each other by a submarine cable. The ring type is a network topology in which, in two sets of point-to-point type networks each in which station devices are disposed on opposite sides, respectively, to be connected to each other by a submarine cable, the station devices arranged on the ground of the identical side are further connected to one another by a submarine cable. The festoon type is a network topology in which station devices arranged on the ground of an identical side are connected in series by a submarine cable.

The optical communication system of the second embodiment is not limited to the optical submarine cable communication system and may be widely applied to the optical communication network in general.

[Frequencies of Monitoring Signals]

The frequency fx of the monitoring signal may be a low frequency which is a predetermined frequency or less that is lower than, for example, a main signal. When the frequency fx of the monitoring signal is low, for example, the relay units 40 easily pass through the monitoring signal so that the noise caused by a main signal or the lines such as, for example, the trunk line 2 and the branch lines 3B to 3D may be reduced.

[Transmission Destination of Command Signal]

In the first embodiment, the transmission destination of a command signal performing a state monitoring is the relay units 40A to 40D. Each of the relay units 40A to 40D transmits parameters regarding the state thereof as a response signal to the command signal. However, in the second embodiment, the BUs 30B to 30D or the GEQs arranged on the trunk line 2 may have the same function as the relay units 40A to 40D, and transmit parameters regarding the states of the BUs 30B to 30D or the GEQs as response signals to the command signals transmitted to the BUs 30B to 30D or the GEQs. Accordingly, it can be more accurately determined that which equipment in each section or which cable section is the cause of a failure occurrence.

[Station Device Detection Matrixes]

In the first embodiment, it has been described that the NOC device 20 includes the station device A matrix 21a to the station device E matrix 21e and performs the determination of a failure occurrence section. However, the second embodiment is not limited thereto. The station devices 10A to 10E may include the station device A matrix 21a to the station device E matrix 21e, respectively, and perform the determination of a failure occurrence section to transmit the determination result to the NOC device 20. In this case, the NOC device 20 detects a failure occurrence section by comprehensively determining the determination result received from the station devices 10A to 10E.

In the above-described embodiments, each of the components of the devices illustrated is not necessarily required to be configured physically as illustrated in the drawings. That is, specific forms of distribution and integration of the components are not limited to those illustrated in the drawings, and some or all of the components may be functionally or physically distributed or integrated in any units depending on various loads and use situations.

Further, some or all of the various processes, which are performed in the respective devices, may be implemented on a central processing unit (CPU). Alternatively, some or all of the various processes, which are performed in the respective devices, may be implemented on a microcomputer such as, for example, an NP, an MPU, an MCU, an ASIC, and an FPGA. Here, the NP refers to a network processor. The MPU refers to a micro processing unit. The MCU refers to a micro controller unit. The ASIC refers to an application specific integrated circuit. The FPGA refers to a field-programmable gate array. Further, some or all of the various processes may be implemented on a program to perform analysis and execution by a CPU (or a microcomputer (e.g., an MPU and an MCU)) or hardware by a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical network system comprising:
a plurality of optical transmission devices each configured to superimpose, on a main signal to be transmitted, a monitoring signal of a different wavelength from wavelengths of other optical transmission devices, the wavelength differing from wavelengths for other optical transmission devices in the optical network system, and extract monitoring signals from main signals received from the other optical transmission devices; and
a monitoring device configured to retain, in a first memory, a plurality of matrix data each which is provided for the respective optical transmission devices and is obtained by associating a presence or a non-presence of the monitoring signals with a failure occurrence section having a communication failure among transmission sections between the optical transmission devices, and determine the failure occurrence section for each of the respective optical transmission devices by acquiring the failure occurrence section having the same content of the presence or the non-presence of the monitoring signals as the presence or the non-presence of the monitoring signals extracted by the respective optical transmission devices from the respective matrix data.

2. The optical network system according to claim 1, wherein at least one of the plurality of optical transmission devices configured to transmit a state acquisition signal to a relay device included in the detected failure occurrence section to acquire a state of the relay device, and wherein whether the communication failure occurs in the relay device is determined, based on the state of the relay device acquired according to the state acquisition signal.

3. An optical network system comprising: a plurality of optical transmission devices, each configured to:
   superimpose, on a main signal to be transmitted, a monitoring signal of a different wavelength from wavelengths of other optical transmission devices, the wavelength differing from wavelengths for other optical transmission devices in the optical network system;
   extract monitoring signals from main signals received from the other optical transmission devices, wherein a failure occurrence section where a communication failure occurs is determined, based on the extracted monitoring signals, among transmission sections between the respective optical transmission devices;
   retain, in a memory, matrix data obtained by associating a presence or a non-presence of the monitoring signals with the failure occurrence section;
   determine a first failure occurrence section by referring to the matrix data based on the extracted presence or the non-presence of the monitoring signals; and
   determine a second failure occurrence section, from the result of the determination of the determined first failure occurrence sections.

4. The optical network system according to claim 3, wherein at least one of the plurality of optical transmission devices configured to transmit a state acquisition signal to a relay device included in the detected failure occurrence section to acquire a state of the relay device, and wherein whether the communication failure occurs in the relay device is determined, based on the state of the relay device acquired according to the state acquisition signal.

5. The optical network system according to claim 1, wherein the optical network system is a fish-bone type.

6. An optical transmission device forming an optical network system with other optical transmission devices, the optical transmission device comprising:
   a memory configured to store a program;
   a processor configured to perform, based on the program, operations to:
   superimpose, on a main signal, a monitoring signal of a different wavelength from wavelengths of the other optical transmission devices;
   receive the main signal and extract the monitoring signal from the main signal received from the other optical transmission devices;
   transmit, to a monitoring device, a reception status of the extracted monitoring signal;
   transmit, according to a state acquisition instruction from the monitoring device for a failure optical transmission device included in a failure occurrence section and among the other optical transmission devices where a communication failure occurs among transmission sections between respective optical transmission devices, a state acquisition signal to the failure optical transmission device; and
   receive, from the failure optical transmission device, a state response of the failure optical transmission device corresponding to the state acquisition signal transmitted.

7. A failure occurrence section determination method in an optical network system formed by a plurality of optical transmission devices, the failure occurrence section determination method comprising:
   superimposing, on a main signal to be transmitted, a monitoring signal of a different wavelength from wavelengths of other optical transmission devices;
   extracting monitoring signals from main signals received from the other optical transmission devices;
   retaining, by a monitoring device, in a first memory, a plurality of matrix data each which is provided for the respective optical transmission devices and is obtained by associating a presence or a non-presence of the monitoring signals with a failure occurrence section having a communication failure among transmission sections between the optical transmission devices; and
   determining, by the monitoring device, the failure occurrence section for each of the respective optical transmission devices by acquiring the failure occurrence section having the same content of the presence or the non-presence of the monitoring signals as the presence or the non-presence of the monitoring signals extracted by the respective optical transmission devices from the respective matrix data.

* * * * *